United States Patent [19]

Machuron-Mandard et al.

[11] Patent Number: 5,069,827

[45] Date of Patent: Dec. 3, 1991

[54] PROCESS FOR REDUCING AND DISSOLVING PUO$_2$

[75] Inventors: Xavier Machuron-Mandard, Antony; Charles Madic, Thiais; Gérard Koehly, Bievres, all of France

[73] Assignee: Commissariat a l'Energie Atomique, Paris, France

[21] Appl. No.: 560,009

[22] Filed: Jul. 25, 1990

Related U.S. Application Data

[63] Continuation of Ser. No. 256,048, Oct. 11, 1988, abandoned.

[30] Foreign Application Priority Data

Oct. 13, 1987 [FR] France .............................. 87 14110

[51] Int. Cl.$^5$ .................................................. G21F 9/00
[52] U.S. Cl. ...................................... 252/626; 252/631; 204/1.5
[58] Field of Search ............... 204/1.5; 252/626, 631

[56] References Cited

U.S. PATENT DOCUMENTS

| | | | |
|---|---|---|---|
| 3,005,682 | 10/1961 | Wilson | 23/14.5 |
| 3,616,275 | 10/1971 | Schneider et al. | 204/1.5 |
| 3,616,276 | 10/1971 | Schneider et al. | 204/1.5 |
| 3,725,294 | 4/1973 | Deaton et al. | 252/301.1 R |
| 3,730,851 | 5/1973 | Schwind et al. | 204/1.5 |
| 3,878,060 | 4/1975 | Kroebel | 204/1.5 |
| 3,948,735 | 4/1976 | Hayden et al. | 204/1.5 |
| 3,957,615 | 5/1976 | Diefenbacher et al. | 204/1.5 |
| 4,021,313 | 5/1977 | Hausberger et al. | 204/1.5 |
| 4,069,293 | 1/1978 | Tallent | 204/1.5 |
| 4,439,279 | 3/1984 | Herrmann et al. | 204/1.5 |
| 4,609,533 | 9/1986 | Heckmann et al. | 423/18 |
| 4,686,019 | 8/1987 | Ryan et al. | 204/1.5 |
| 4,725,413 | 2/1988 | Heckmann et al. | 423/11 |
| 4,741,810 | 5/1988 | Heilgeist et al. | 204/1.5 |
| 4,749,519 | 6/1988 | Koehly et al. | 252/627 |
| 4,758,313 | 7/1988 | Schmieder et al. | 204/1.5 |

FOREIGN PATENT DOCUMENTS

| | | |
|---|---|---|
| 0228679 | 6/1983 | European Pat. Off. |
| 1465032 | 1/1967 | France |
| 1387127 | 12/1968 | France |
| 2456545 | 12/1980 | France |

OTHER PUBLICATIONS

V. T. Marchenko et al., Kinetics of the Reaction of Plutonium Ions with Tetravalent Uranium in Nitric Acid Solution, pp. 479-484, Jul. 1974.
T. W. Newton et al., The Kinetics of the Reaction Between Pu(IV) and Fe(II), pp. 244-247, Aug. 1959.
Cleveland, J. M. The Chemistry of Plutonium, 1970, pp. 47-58.

*Primary Examiner*—Brooks H. Hunt
*Assistant Examiner*—Ngoclan T. Mai
*Attorney, Agent, or Firm*—Pearne, Gordon, McCoy & Granger

[57] ABSTRACT

A process for reducing and dissolving PuO$_2$ comprises contacting the plutonium dioxide with a hydrazine-free, acid aqueous solution containing a reducing agent, whose redox potential is below +0.5 V/ENH in order to reduce and dissolve the plutonium. The reducing agent can be $Cr^{2+}$ or $U^{4+}$.

14 Claims, No Drawings

PROCESS FOR REDUCING AND DISSOLVING PUO2

This is a continuation of application Ser. No. 07,256,048 filed on Oct. 11, 1988 now abandon.

The present invention relates to a process for dissolving a refractory compound of plutonium which it is difficult to dissolve, namely plutonium dioxide. It more particularly applies to the dissolving of said compound present in solid waste and in particular in organic waste.

One of the main problems which is frequently encountered in nuclear installations is the recovery of the plutonium in the form of $PuO_2$, which is substantially insoluble in acid solutions. This compound is more particularly present in solid waste resulting either from the production of nuclear fuel elements, or from the processing of irradiated nuclear fuels. Such waste can be constituted by ash resulting from incineration at 800° to 900° C. of highly plutonium contaminated combustible waste in which the plutonium is in oxide form. Other waste is constituted by laboratory waste, particularly organic material waste, such as plastic and cellulose material waste contaminated by plutonium in the form of oxide which it is difficult to dissolve.

Hitherto four methods have been used for dissolving plutonium dioxide.

The first method consists of maintaining the plutonium in the tetravalent state during its dissolving. One process is based on the catalytic action of fluoride ions and the formation of a complex anion $PuF^{3+}$ making it possible to solubilize the plutonium in a nitric solution. This dissolving can be accelerated by adding a silver compound which oxidizes the complex ion $PuF^{3+}$ and thus regenerates the $F^-$ ions. This process is more particularly described in U.S. Pat. Nos. 3,976,775 and 4,069,293.

This process suffers from the disadvantage of requiring the use of corrosive reagents and of producing fluorinated effluents, whose treatment causes problems. Moreover, when the plutonium is present in reducing organic waste, the latter can be oxidized by $Ag^{2+}$ ions, which no longer fulfil their function of accelerating the plutonium oxide dissolving reaction. Thus, this process is not very suitable for the treatment of organic waste.

Another possible way of dissolving plutonium whilst maintaining it in the tetravalent state is to transform it into plutonium sulphate by the action of concentrated sulphuric acid at a high temperature of approximately 250° C. and as is described by B. Stojanik et al in Radiochimica Acta, 36, pp 155–157, 1984. Thus, this process suffers from the disadvantage of requiring the use of high temperatures and concentrated acid solutions. Moreover, it does not permit the complete dissolving of $PuO_2$, when the latter has been exposed to high temperatures.

The second procedure for dissolving plutonium dioxide consists of oxidizing dissolving in which the plutonium is brought into the soluble state by oxidizing at valence VI. This can be obtained by using a powerful oxidizing agent such as the ion $Ag^{2+}$ and as is described in European patents 160 589 and 158 555.

This procedure is very interesting because it makes it possible to obtain high dissolving rates. However, it is not very suitable for the treatment of organic waste having reducing properties because, in this case, the reducing organic materials can be oxidized by the $Ag^{2+}$ ions, which can therefore no longer participate in the dissolving reaction. This reduces the effectiveness of the process and greatly increases the waste treatment time, which constitutes a handicap for the performance of this type of treatment on an industrial scale.

A third plutonium dioxide dissolving procedure consists of treating the plutonium dioxide by a concentrated 6M hydroiodic acid solution brought to the boiling temperature and as is described in U.S. Pat. No. 4,134,960. However, in such a process, the dissolving rate is relatively low and the effluent obtained is difficult to treat.

A fourth procedure based on the reduction of plutonium described in FR-A-2 553 560 consists of dissolving the plutonium dioxide in a nitric solution brought to boiling point and which contains uranium IV and hydrazine. Thus, in this process, the stabilization of the uranium IV by hydrazine is necessary. In addition, a hydrazine depletion at the end of dissolving can lead to an autocatalytic oxidation of the uranium IV excess, i.e. an explosive reaction making its performance on an industrial scale difficult.

Thus, the presently known processes do not make it possible to ensure under good conditions the dissolving of a refractory compound of plutonium, such as plutonium dioxide and which is present in waste having reducing properties.

The present invention specifically relates to a process for the reducing dissolving of plutonium dioxide, which obviates this disadvantage.

This process consists of contacting the plutonium dioxide with a hydrazine-free, acid aqueous solution, which contains a reducing agent, whose redox potential is below +3.5 V/ENH in order to reduce the plutonium and to dissolve the same.

The inventive use of reducing agents having a potential below +0.5 V/ENH makes it possible to carry out the reduction of the plutonium from valence IV to valence III and thus solubilize the same in the acid solution.

Thus, the standard potential of the transformation

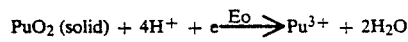

$$PuO_2 \text{ (solid)} + 4H^+ + e^- \xrightarrow{E_o} Pu^{3+} + 2H_2O$$

is $E_o = 0.544$ V/ENH at 25° C. and $E_o = 0.487$ V/ENH at 85° C. Moreover, the use of reducing agents having a redox potential below +0.5 V/ENH make it possible to obtain said transformation.

Thus, contrary to what is indicated in FR-A-2 553 560, the ferrous ion $Fe^{2+}$, whose redox potential is equal to +0.77 V/ENH is not suitable for carrying out this transformation.

Examples of suitable reducing agents are $Cr^{2+}$, $U^{4+}$, $U^{3+}$, $Eu^{2+}$, $V^{3+}$, $V^{2+}$, $Ti^{3+}$ and $Ti^{2+}$.

According to the invention, the reducing agent is chosen in such a way as to obtain a favourable dissolving kinetics as a function of the solution and operating conditions used.

According to a first embodiment of the inventive process, the reducing agent is present in the acid aqueous solution in a quantity adequate to reduce all the plutonium to be dissolved. When the reducing agent is one of the aforementioned ions, it can be introduced in the form of a soluble salt, e.g. sulphate. It is also possible to introduce it in solution in oxidized form and to reduce the solution, e.g. by electrochemistry or by zinc amalgam.

When the oxidation reaction of the reducing agent only uses a single electron, it is necessary for the molar concentration in the reducing agent of the solution to at least be equal to the molar concentration of the plutonium to be dissolved. If the oxidation reaction of the reducing agent uses several electrons, the molar concentrations of the reducing agent can be lower.

This embodiment of the process can be used when there are only small plutonium quantities to be dissolved. However, in the case of relatively large quantities, it is preferable to regenerate the reducing agent in solution to limit the reducing agent quantities used.

According to a second embodiment of the inventive process, the reducing agent in solution is regenerated by electrolysis. This can be carried out by using the oxidizing dissolving installations described in European patents 158 555 and 160 589, where the oxidizing agent $Ag^{2+}$ is regenerated by electrolysis. In the invention, regeneration takes place on the cathode and the anode and cathode compartments are reversed as compared with what is used in installations for oxidizing dissolving. In this second embodiment of the inventive process, the reducing agent concentration in the solution is generally 0.02 to 0.2 mol/l.

The acid aqueous solutions used for dissolving can be of different types, the only condition being that the acid is compatible with the chemical species which can occur in solution and in particular with the plutonium and reducing agent.

For example, it is possible to use sulphuric acid, preferably at a molar concentration of 0.5 to 7 mol/l. It would also be possible to use formic acid.

It is preferable to avoid using nitric acid due to possible reactions between the nitrous acid and the reducing agent, particularly in the case of U(IV).

On regenerating the reducing agent by electrolysis, the plutonium to be dissolved, optionally included in waste in the presence of the dissolving solution is brought into the cathode compartment of an electrolyzer having an anode and a cathode. The reducing agent can be introduced in oxidized form and can be generated at the start of the reaction by applying an adequate potential difference to reduce its oxidized form.

Preferably, the solution is vigorously stirred, on the one hand to facilitate exchanges between the solution and the cathode and on the other in order to perfectly impregnate the plutonium dioxide or the waste containing the same with the solution. In this way the reactions are accelerated and in particular the reduction of the oxidized species of the reducing agent, because the reducing kinetics are mainly dependent on the speed at which the ions to be reduced can reach the cathode.

Generally, the potential difference is applied in such a way as to impose a constant current in the cell, which permits the permanent regeneration of the reducing agent.

The material from which the cathode is made must comply with the electrochemical properties of the reducing agent and have adequate mechanical and chemical characteristics to remain unimpaired under the adopted operating conditions.

When the regeneration of the reducing agent takes place at a potential higher than that of the reduction of the solution, the cathode can be made from platinum. In the case of more powerful reducing agents requiring a high cathode overvoltage, it is possible to use an electrode having a solid copper support covered with gold, whereby it is amalgamed by soaking in mercury. Thus, such an electrode roughly has the cathode overvoltage of mercury due to the use of gold amalgam as the electro-active material. The copper support contributes to the rigidity of the electrode. The use of such an electrode is particularly suitable for the regeneration of powerful reducing agents such as $Cr^{2+}$, $U^{4+}$, $U^{3+}$, $Eu^{2+}$, $V^{2+}$, $Ti^{3+}$ and $Ti^{2+}$.

In order to improve the efficiency of electrolysis, as well as the reaction rate between the reducing agent and the plutonium compound, it is preferable to work at a temperature above ambient temperature, e.g. at 50° to 100° C.

Moreover, when the reducing agent used reacts with the oxygen, the cathode compartment is placed under an inert atmosphere to prevent said reaction. A condenser is also added to the cathode compartment in order to limit the vaporization of the solution.

Other features and advantages of the invention can be better gathered from reading the following examples concerning the performance of the inventive process and which are obviously given in an illustrative and non-limitative manner.

Comparative examples 1 and 5 reveal the advantages provided by the inventive process.

EXAMPLE 1

Dissolving $PuO_2$ by $Cr^{2+}$ in 5M $H_2SO_4$

Use is made of an electrolyzer having a platinum anode and a cathode constituted by a solid copper support covered with gold and which has been amalgamed by soaking in mercury. The electrolyzer is subdivided into two compartments by a porous wall.

Into the cathode compartment are introduced 1134 mg of $PuO_2$ powder calcined at 500° C. and 100 ml of a sulphuric acid solution with 5 mol/l of $H_2SO_4$ containing 0.1 mol/l of $Cr^{3+}$ ions. The solution is stirred with a magnetic stirrer and between the anode and the cathode is applied a potential difference such that the current density on the cathode is 0.036 A/cm$^2$, whilst maintaining the electrolyzer at 85° C.

After stirring for 16 minutes, it is found that the dissolving rate is 100%, 85% of the plutonium being present in the solution in the form of Pu(III), which corresponds to 8.5 g/l and the remaining 15% are present in the form of a blue precipitate of plutonium (III) sulphate. The corresponding dissolving rate is 6.25%/min, which corresponds to a faradic yield of 37.7%.

COMPARATIVE EXAMPLE 1

Dissolving $PuO_2$ by 5M $H_2SO_4$

The same operating procedure as in example 1 is adopted in order to attempt to dissolve 113 mg of the same $PuO_2$ powder in the same solution operating at a temperature of 85° C. and accompanied by stirring, but without applying a potential difference between the anode and the cathode. Thus, it is not possible to produce and then regenerate in the solution the $Cr^{2+}$ ions, which serve as the plutonium reducing agent.

Under these conditions, after stirring for 2 hours, the dissolving rate does not exceed 10%, which corresponds to a rate of 0.1%/min. Thus, sulphuric acid is ineffective in the absence of the reducing agent for the reduction of plutonium dioxide.

EXAMPLE 2

Dissolving $PuO_2$ by $Cr^{2+}$ in 1M $H_2SO_4$

The same operating procedure as in example 1 is used for dissolving 1134 mg of a $PuO_2$ powder identical to that of example 1 and using 100 ml of sulphuric acid solution at 1 mol/l of sulphuric acid and containing 0.1 mol/l of $Cr^{3+}$. The same temperature, current density and stirring conditions are used.

After stirring for 8 minutes, the dissolving rate is 100% and a 10 g/l $Pu^{3+}$ solution is obtained. Thus, the reaction rate is equal to 12.5%/min, which corresponds to a faradic yield of 80%.

EXAMPLE 3

Dissolving $PuO_2$ by $Cr^{2+}$ in 1M $H_2SO_4$

In this example, $PuO_2$ is dissolved without electrolytically regenerating the reducing species, i.e. the $Cr^{2+}$ ions.

A mass of 266 mg of $PuO_2$ powder calcined at 450° C. is introduced into a thermostatically controlled reactor under an inert atmosphere. Into the reactor are introduced 120 ml of a sulphuric acid solution at 1 mol/l and containing 0.1 mol/l of $Cr^{2+}$ ions. After stirring for 9 min at 70° C., the dissolving rate is 100%, which corresponds to a dissolving rate of 11%/min and to a final plutonium concentration in the solution of 2 g/l.

Thus, when using an adequate chrome ion quantity for reducing all the plutonium, it is not necessary to electrolytically regenerate the $Cr^{2+}$ ions and $PuO_2$ can be dissolved under good conditions.

EXAMPLE 4

Dissolving $PuO_2$ by U(IV)

The same operating procedure as in example 2 is followed for dissolving 1134 mg of $PuO_2$ powder calcined at 500° C., but using 100 ml of a uranyl sulphate solution having a sulphuric acid concentration of 1 mol/l and a $UO_2^{2+}$ ion concentration of 0.1 mol/l. The reducing agent $U^{4+}$ is produced and regenerated electrolytically and the same temperature, cathode current density and stirring conditions as in example 1 are followed. After stirring for 40 min, the dissolving rate is 100%, which corresponds to a rate of 2.5%/min and to a faradic efficiency of 13%.

Thus, uranium IV is effective for dissolving $PuO_2$ in sulphuric solution, but the reaction is slightly slower.

EXAMPLE 5

Dissolving $PuO_2$ in the presence of cellulose by $Cr^{2+}$ in 1M $H_2SO_4$

The same operating conditions as in example 2 are used for dissolving 1134 mg of $PuO_2$ identical to that of example 2 and to which is added 1 g of finely divided cellulose. The same solution as in example 2 is used, as well as the same temperature, stirring and cathode current density conditions. After stirring for 8 min, the dissolving rate is 100% as in example 2 and the plutonium (III) content of the solution is 10 g/l.

COMPARATIVE EXAMPLE 5

Oxidizing dissolving using silver of the $PuO_2$/cellulose mixture

In this example, use is made of the oxidizing dissolving process described in European patent 158 555 for dissolving $PuO_2$ in the presence of cellulose. Thus, into the electrolyzer are introduced 1134 mg of $PuO_2$ identical to that of example 1 and 1 g of finely divided cellulose, followed by the addition of 100 ml of a 5 mol/l nitric acid solution containing 0.1 mol/l of $Ag^+$ and an anode current density of 0.036 $A/cm^2$ is applied in order to regenerate the $Ag^+$ ions and working at 25° C.

Under these conditions, after stirring for 100 min, the $PuO_2$ dissolving rate is only approximately 40%, which corresponds to a dissolving rate of 0.4%/min and a faradic efficiency of 5%. Thus, oxidizing dissolving using silver is much less effective for dissolving $PuO_2$ in the presence of organic materials with reducing properties.

EXAMPLE 6

Decontamination of cryobroyats by reducing dissolving

In this example, dissolving takes place of the plutonium present in nuclear waste formed from cryobroyats, which are waste materials mainly constituted by contaminated, crushed or ground organic substances. In the reactor is placed a mass of 6.33 g of cryobroyats and 100 ml of a 1 mol/l sulphuric acid solution containing 0.1 mol/l of $Cr^{3+}$ ions is added. A temperature of 85° C. is maintained and the same cathode current density (0.036 $A/cm^2$) and the same stirring conditions as in example 1 are used. After reacting for 62 min, the decontamination rate is 100%.

Thus, the inventive process makes it possible to bring about a plutonium decontamination of the organic waste under good conditions and with relatively short treatment periods.

EXAMPLE 7

Decontamination of crushed organic waste by reducing dissolving using V(II) and V(III)

In the electrolyzer is placed a mass of 12.44 g of plutoniferous waste and 200 ml of 1.05 mol/l sulphuric acid containing 0.1 mol/l of $VOSO_4$. The mixture is raised to a temperature of 85° C. and electrolysis is carried out by using a current density equal to 0.029 $A/cm^2$. After 135 min electrolysis, it is found that 90% of the plutonium initially present in the waste has dissolved.

The curve translating the solubilization kinetics of the plutonium shows that V(III) (generated at the start of electrolysis) and V(II) (generated when all the initial V(IV) had disappeared) are effective for solubilizing the plutonium contained in the waste.

EXAMPLE 8

Decontamination of crushed organic waste by reducing dissolving using U(IV) and U(III)

The same operating procedure as in example 7 is adopted but using $UO_2SO_4$ in place of $VOSO_4$. The waste has the same origin as example 7 and the electrolysis conditions are the same as in the latter. After electrolysis for 210 min a solubilization rate of the plutonium equal to 90% is reached.

The solubilization kinetics of the plutonium shows that U(IV) and U(III) are effective. Nevertheless the action of U(III) leads to a faster solubilization of the plutonium.

We claim:

1. Process for dissolving solid plutonium dioxide, comprising the step of contacting the solid plutonium dioxide with a hydrazine-free, acid aqueous solution containing a reducing agent, whose redox potential is below +0.5 V/ENH to reduce and dissolve the plutonium, the valence of the plutonium being reduced from IV to III, said acid aqueous solution being selected from the group consisting of a sulfuric acid solution and a formic acid solution.

2. Process according to claim 1, wherein the reducing agent is present in the solution in a quantity adequate for reducing all the plutonium to be dissolved.

3. Process according to claim 1, wherein the reducing agent in solution is regenerated by electrolysis.

4. Process according to claim 1, wherein the reducing agent is selected from the group consisting of $Cr^{2+}$, $U^{4+}$, $U^{3+}$, $Eu^{2+}$, $V^{3+}$, $V^{2+}$, $Ti^{3+}$ and $Ti^{2+}$.

5. Process according to claim 1, wherein the aqueous solution is a sulphuric acid solution.

6. Process according to claim 5, wherein the aqueous solution contains 0.5 to 7 mol/l of sulphuric acid.

7. Process according to claim 3, wherein the reducing agent concentration of the acid solution is 0.02 to 0.2 mol/l.

8. Process according to claim 3, wherein dissolving takes place in an electrolytic cell having a cathode and an anode, subdivided into a cathode compartment and an anode compartment by a porous wall, the plutonium compound to be dissolved is introduced into the cathode compartment and between the anode and the cathode is applied a potential difference adequate for regenerating the reducing agent and accompanied by the stirring of the solution.

9. Process according to claim 8, wherein the cathode comprises a gold-covered, solid copper support amalgamed by soaking in mercury.

10. Process according to claim 1, wherein a temperature of 50° to 100° C. is used.

11. Process according to claim 1, wherein the plutonium dioxide is present in solid organic waste, said solid organic waste having reducing properties.

12. Process according to claim 11, wherein the organic waste is cellulose waste.

13. Process according to claim 4, wherein the reducing agent is $Cr^{2+}$.

14. Process according to claim 4, wherein the reducing agent is $V^{2+}$.

* * * * *